(12) United States Patent
Lizotte

(10) Patent No.: US 6,853,489 B2
(45) Date of Patent: Feb. 8, 2005

(54) CORRECTION OF ANGULAR DEVIATION AND RADIAL DRIFT OF LASER BEAMS

(75) Inventor: Todd E. Lizotte, Manchester, NH (US)

(73) Assignee: Hitachi Via Mechanics, Ltd., Ebina (JP)

( * ) Notice: Subject to any disclaimer, the term of this patent is extended or adjusted under 35 U.S.C. 154(b) by 0 days.

(21) Appl. No.: 10/411,570

(22) Filed: Apr. 10, 2003

(65) Prior Publication Data
US 2004/0201897 A1 Oct. 14, 2004

(51) Int. Cl.[7] ............................ G02F 1/01; G02B 27/64; G02B 27/10; G02B 27/30
(52) U.S. Cl. ........................ 359/618; 359/641; 359/288; 359/554
(58) Field of Search ................................. 359/218, 618, 359/785, 350, 353, 206, 217, 795, 205, 207, 212, 298, 288, 555, 554, 641, 1

(56) References Cited

U.S. PATENT DOCUMENTS 5,486,694 A    1/1996  Harris .......................... 250/236
6,075,650 A *  6/2000  Morris et al. ................ 359/641

* cited by examiner

Primary Examiner—Hung Xuan Dang
Assistant Examiner—Joseph Martinez
(74) Attorney, Agent, or Firm—Davis & Bujold, P.L.L.C.

(57) ABSTRACT

A laser correction element for the correction of angular deviation due to pointing instability and radial displacement due to thermal drift, including one or more of an angular deviation non-symmetric optical element for redirecting a beam axis of a laser beam through a first corrective angle dependent upon the angle of incidence of the laser beam on the angular deviation element to be parallel with an optimum centerline and a radial displacement non-symmetric optical element for redirecting a beam axis of a laser beam through a second corrective angle dependent upon a radial displacement of the beam axis. A collimating non-symmetric optical element may redirect the laser beam through a third corrective angle dependent on radial displacement of the beam axis from a centerline and angle of incidence on the collimating element.

20 Claims, 4 Drawing Sheets

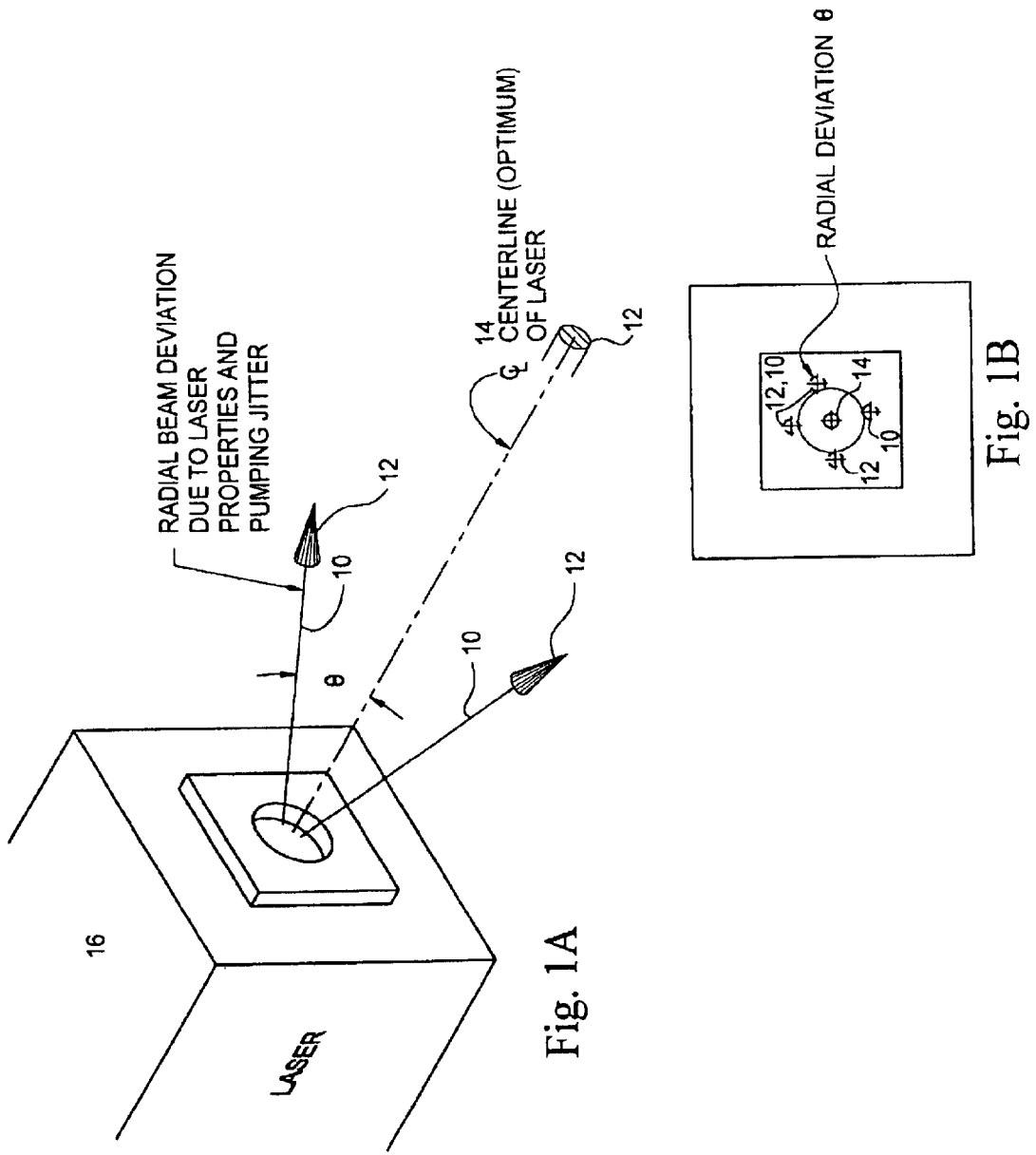

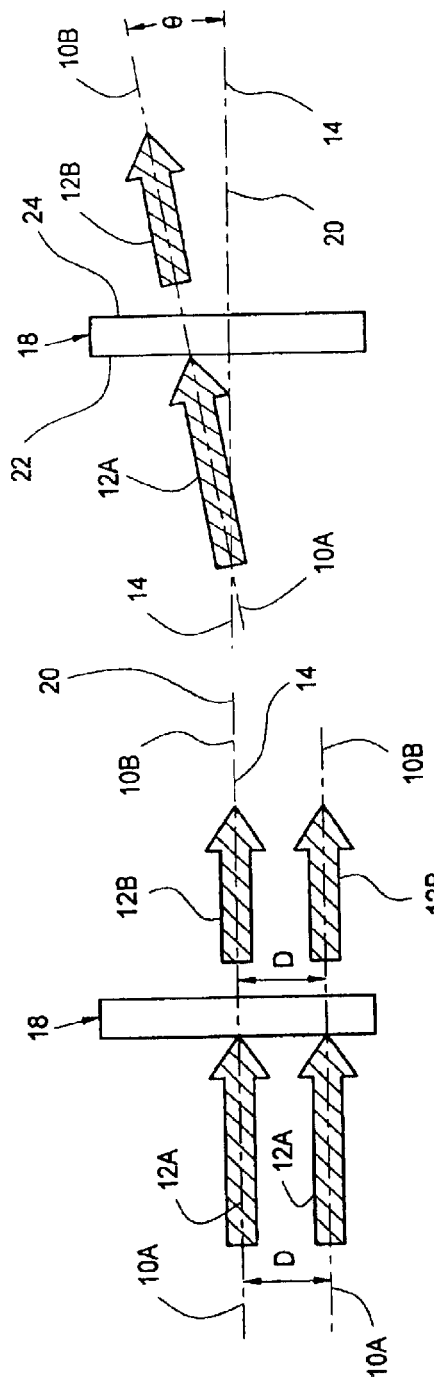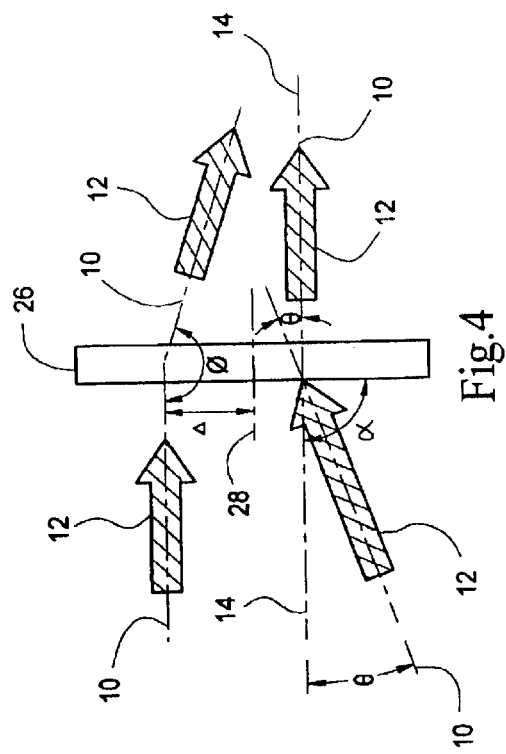
Fig.3A  Fig.3B  Fig.4

CORRECTION OF ANGULAR DEVIATION AND RADIAL DRIFT OF LASER BEAMS

FIELD OF THE INVENTION

The present invention relates to the control of a laser beam and, in particular, to the control and correction of wobble and drift in the pointing of a laser beam in a laser system.

BACKGROUND OF THE INVENTION

Focused and directed laser beams are commonly used for a variety of processes, such as drilling of blind, through and micro-vias, laser imaging, dicing of substrates and modification or customization of integrated circuits, drilling, cutting, and selective material removal and other complex machining and micro-machining operations involving materials such as metals, polymers, integrated circuits, substrates, ceramics and other materials. Such processes have become very complex, often involving the concurrent or sequential of use of single or multiple lasers or multiple types of lasers, such as visible, infra-red (IR) and ultraviolet (UV) lasers, in concurrent or sequential operations. In general, however, the general object of a laser system is to controllably and reliably direct, focus and concentrate the energy of one or more laser beans to converge each beam at a desired spot or to image an apertured area of a laser beam onto the surface of an object.

Two recurring problems of conventional laser systems of the prior art, however, directly affect the reliable and controllable "pointing" of a laser beam to a desired location. The first, which is illustrated in FIGS. 1A and 1B, is often referred to as "beam wobble", also referred to as "pointing instability", and is the radial deviation of the Beam Axis 10 of Laser Beam 12 from an Optimum Centerline 14 by a Deviation Angle θ. Pointing instability is essentially inherent in both the properties of a Laser 16 itself, and in the normal operations of a Laser 16, such as "pumping jitter".

The second problem of the prior art is illustrated in FIGS. 2A and 2B and is often referred to as "thermal drift", which again causes the Beam Axis 10 of Laser Beam 12 to drift from an Optimum Centerline 14. Thermal drift is generally regarded as due to changes in the parameters of the Laser 16 due to heating during operation, changes in power levels and changes in the operational environment of the Laser 16. It should be noted that, unlike "pointing instability" which results in an angular deviation of the Beam Axis 10 from the Optimum Centerline 14, "thermal drift" results in a linear radial drift of the Beam Axis 10 with respect to the Optimum Centerline 14. That is, the Beam Axis 10 of Laser Beam 12 remains parallel to the axis of Optimum Centerline 14, but drifts radially away from Optimum Centerline 14.

The present invention addresses these and other related problems of the prior art.

SUMMARY OF THE INVENTION

The present invention is directed to a correction element or elements for the correction of angular deviation or radial displacement of laser beams due to pointing instability or thermal drift.

In a first embodiment as a correction element for correcting angular deviation of a laser beam due to pointing instability, the correction element includes an angular deviation non-symmetric optical element for redirecting a beam axis of a laser beam through a corrective angle so that the beam axis is parallel with an optimum centerline of the laser beams wherein the corrective angle is dependent upon a radial displacement of the beam axis from a centerline of the non-symmetric optical element, and wherein the magnitude of the corrective angle increases with one of increasing radial displacement of the beam axis from a centerline of the non-symmetric optical element and a decreasing angle of incidence of the laser beam on the non-symmetric optical element.

In a second embodiment as a correction element for the correction of radial displacement of laser beams due to thermal drift, the correction element includes a radial displacement non-symmetric optical element for redirecting a beam axis of a laser beam through a first corrective angle dependent upon a radial displacement of the beam axis from a centerline of the non-symmetric optical element and directing the beam axis onto a focus area at a selected distance from the radial displacement non-symmetric optical element. The magnitude of the corrective angle increases with increasing radial displacement of the beam axis from the centerline of the radial displacement non-symmetric optical element, and the correction element includes a collimating non-symmetric optical element located at the focus area for redirecting the laser beam through a second corrective angle wherein the magnitude of the second corrective angle increases with one of decreasing radial displacement of the beam axis from a centerline of the collimating non-symmetric optical element and an increasing angle of incidence of the laser beam on the collimating non-symmetric optical element.

In a third embodiment as a correction element for the correction of at least one of an angular deviation of laser beams due to pointing instability and radial displacement of laser beams due to thermal drift, the correction element includes an angular deviation non-symmetric optical element for redirecting a beam axis of a laser beam through a first corrective angle so that the beam axis is parallel with an optimum centerline of the laser beams, wherein the first corrective angle increases with a decreasing angle of incidence of the laser beam on the angular deviation non-symmetric optical element. The correction element also includes a radial displacement non-symmetric optical element for redirecting a beam axis of a laser beam through a second corrective angle dependent upon a radial displacement of the beam axis from a centerline of the non-symmetric optical element and directing the beam axis onto a focus area at a selected distance from the radial displacement non-symmetric optical element, wherein the second corrective angle increases with increasing radial displacement of the beam axis from the centerline of the radial displacement non-symmetric optical element. Finally, a collimating non-symmetric optical element is located at the focus area for redirecting the laser beam through a third corrective angle wherein the magnitude of the third corrective angle increases with one of decreasing radial displacement of the beam axis from a centerline of the collimating non-symmetric optical element and an increasing angle of incidence of the laser beam on the collimating non-symmetric optical element.

In a further embodiment, a correction element for the correction of at least one of an angular deviation of laser beams due to pointing instability and radial displacement of laser beams due to thermal drift includes a correcting non-symmetric optical element for redirecting a beam axis of a laser beam through a first corrective angle so that the beam axis is parallel with an optimum centerline of the laser beams, wherein the first corrective angle increases with a decreasing angle of incidence of the laser beam on the angular deviation non-symmetric optical element, and redirecting a beam axis of a laser beam through a second corrective angle dependent upon a radial displacement of the beam axis from a centerline of the non-symmetric optical element and directing the beam axis onto a focus area at a selected distance from the radial displacement non-symmetric optical element, wherein the second corrective angle increases with increasing radial displacement of the beam axis from the centerline of the radial displacement non-symmetric optical element. A collimating non-symmetric optical element is located at the focus area for redirecting the laser beam through a third corrective angle wherein the magnitude of the third corrective angle increases with one of decreasing radial displacement of the beam axis from a centerline of the collimating non-symmetric optical element and an increasing angle of incidence of the laser beam on the collimating non-symmetric optical element.

In the various embodiments of the present invention, the correction element may be a non-symmetric hologram optical element, a non-symmetric lens, a non-symmetric refraction element, or a non-symmetric diffraction element.

BRIEF DESCRIPTION OF THE DRAWINGS

The invention will now be described, by way of example, with reference to the drawings, wherein:

FIGS. 1A and 1B are illustrative diagrams of angular deviation of a laser beam due to pointing instability;

FIGS. 3A and 3B are illustrative diagrams of radial displacement and angular deviation of laser beams;

FIG. 4 is an illustrative diagram of the method of the present invention for correcting angular deviation or radial displacement.

DETAILED DESCRIPTION OF THE INVENTION

Figures 2A, 2B:
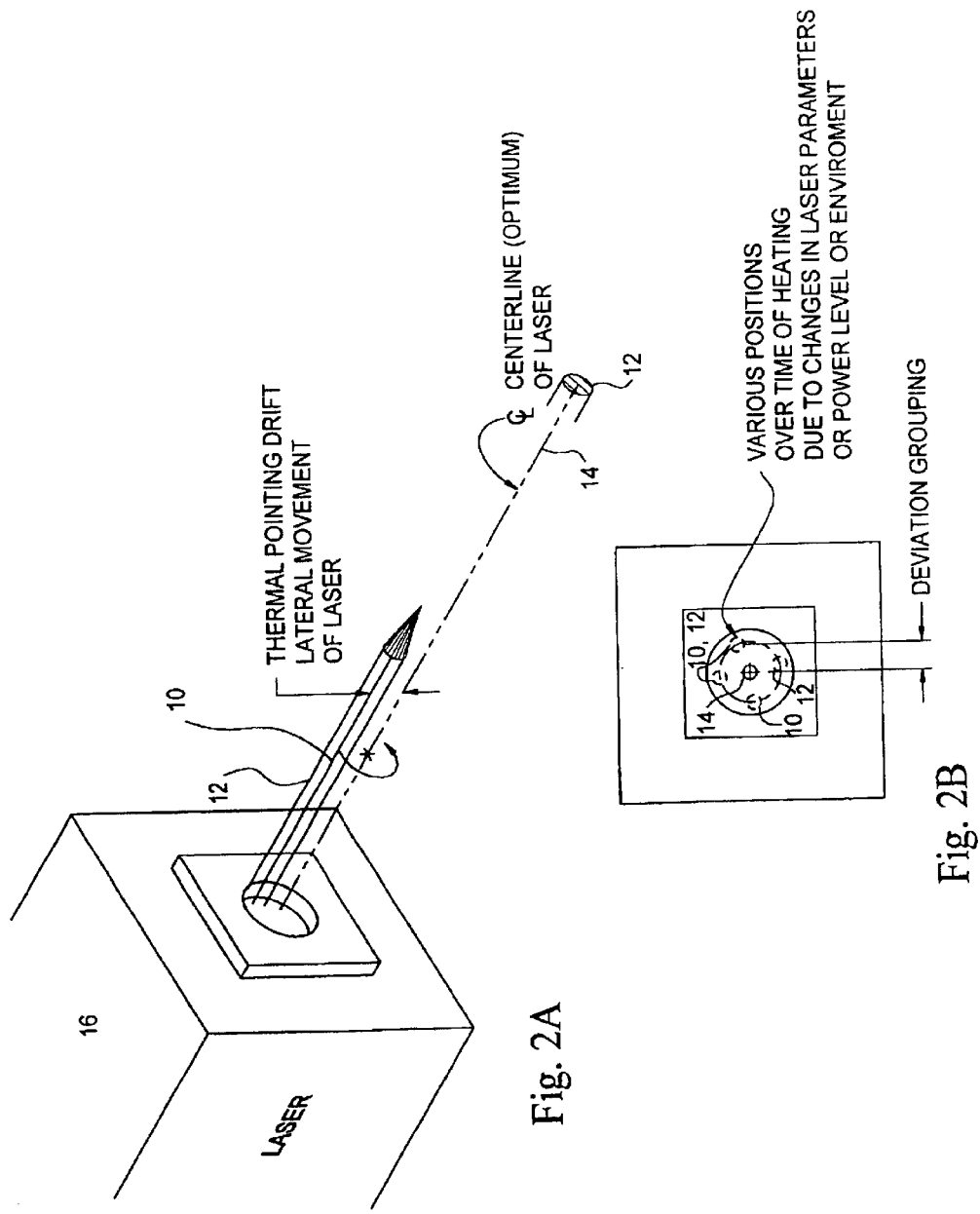
FIGS. 2A and 2B are illustrative diagrams of radial drift of a laser beam due to thermal drift.

As described herein above, the two problems of "pointing instability" and "thermal drift" both result in the deviation of the axis of a Beam Axis 10 of a Laser Beam 12 from an Optimum Centerline 14, wherein "pointing instability" results in an angular deviation of the Beam Axis 10 from the Optimum Centerline 14 while "thermal drift" results in a linear radial deviation of the Beam Axis 10 from the Optimum Centerline 14.

Next considering the effects of "pointing instability" and "thermal drift", FIG. 3A illustrates the results of radial displacement due to thermal drift effects in the case of a Holographic Optical Element (HOE) and, in particular, with respect to a Standard Symmetric Holographic Optical Element (SSHOE) 18, or an equivalent lens. Because the SSHOE 18 is symmetric, a Laser Beam 12A that enters the SSHOE 18 along a Beam Axis 10A that is parallel to the HOE Axis 20 will exit the SSHOE 18 as Laser Beam 12B on Beam Axis 10B wherein Beam Axis 10B is coaxial with and a linear continuation of Beam Axis 10B. More specifically, a Laser Beam 12A entering the SSHOE 18 along a Beam Axis 10A that is parallel to but radially displaced by a distance D from the HOE Axis 20 will exit the SSHOE 18 along the same Beam Axis 10A, indicated as Beam Axis 10B, and will remain radially displaced with respect to the HOE Axis 20 by a distance D. As such, a SSHOE 18 or equivalent symmetric lens will not radially redirect the Beam Axis 10 of an entering Laser Beam 12 with respect to the HOE Axis 20 of the SSHOE 18, and thereby cannot correct for or control thermal drift effects.

Referring to FIG. 3B, a Laser Beam 12A effected by "pointing instability" will enter an Entry Face 22 of the SSHOE 18 along Beam Axis 10A having an angular deviation $\theta$ with respect to the HOE Axis 20, that is, will not be parallel with the HOE Axis 20. Because of the symmetry of a SSHOE 18 or equivalent symmetric lens, however, the Laser Beam 12B will exit the Exit Face 24 of the SSHOE 18 along a Beam Axis 10B that is the continuation of the Beam Axis 10A along which the Laser Beam 12A entered SSHOE 18. As in the case of thermal drift, therefore, conventional SSHOEs 18 and similar symmetric lenses cannot correct for or control pointing instability and the resulting angular deviation of the Beam Axis 10.

Laser systems of the prior art have attempted to correct the effects of "pointing instability" and "thermal drift" by the use of actively controlled servo-mirrors, which are controlled to redirect a laser beam so as to correct for the "pointing instability" and "thermal drift". Such methods, however, require detecting and comparing the actual path of a beam due to pointing instability or thermal instability with the desired optimum path for the beam and controlling the servo-mirrors so as to direct the beam into the desired path. Not only are such methods complex and expensive, but they have an inherent time delay in detecting and correcting the effects of pointing instability or thermal drift, and introduce errors of their own due to mechanical and control system tolerances and have thereby not provided completely satisfactory solutions to these problems.

According to the present invention, and as illustrated in FIG. 4, either or both of radial displacement due to thermal drift and angular deviation due to pointing instability may be corrected by means of a Non-Symmetric Element (NSE) 26, wherein an NSE 26 may be, for example, a Non-Symmetric Hologram Optical Element (NSHOE) or an equivalent optical element, such as a non-symmetric lens or a non-symmetric refraction element or a non-symmetric diffraction element. A NSE 26 differs from a SSHOE 18 or equivalent symmetric element in that the path of the Beam Axis 10 of a Laser Beam 12 traversing the NSE 26 is refracted, or turned, through a Correction Angle $\phi$ during the passage of the Laser Beam 12 through the NSE 26. As will be discussed further in the following, in one embodiment of a NSE 26 the angle $\phi$ increases with increasing radial displacement $\Delta$ of the incident Beam Axis 10 from the Centerline Axis 28 of the NSE 26. In a second embodiment of a NSE 26, the Correction Angle $\phi$ increases with an decreasing angle of incidence $\alpha$ of the Beam Axis 10 of the incident Laser Beam 12 with respect to the plane surface of the NSE 26.

Figure 5B:
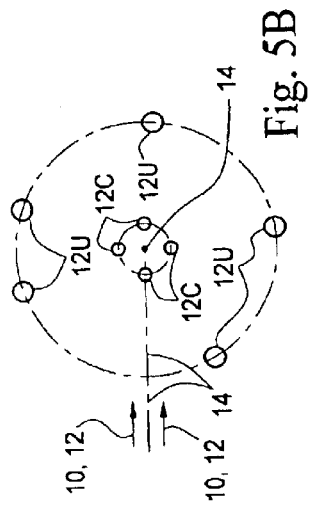
FIGS. 5A, 5B, 5C, 5D, 5E and 5F and illustrative diagrams of embodiments of the methods and apparatus of the present invention for correcting angular deviation and radial drift of laser beams.
Figure 5D:
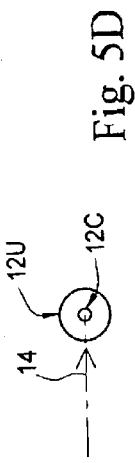
Figure 5F:
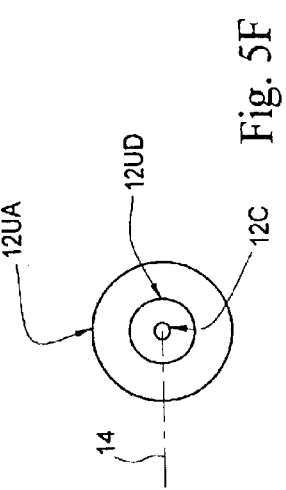
Figure 5A:
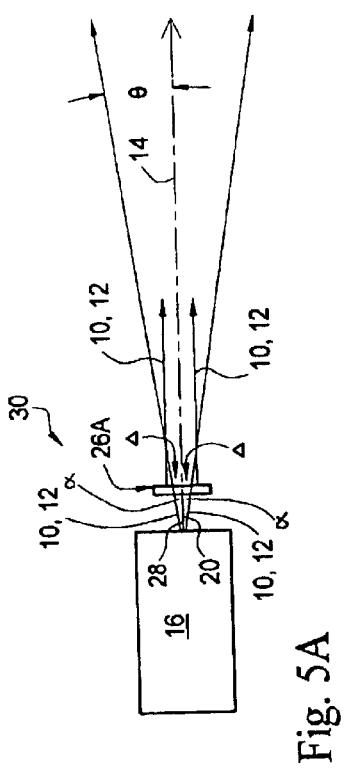
Figure 5C:
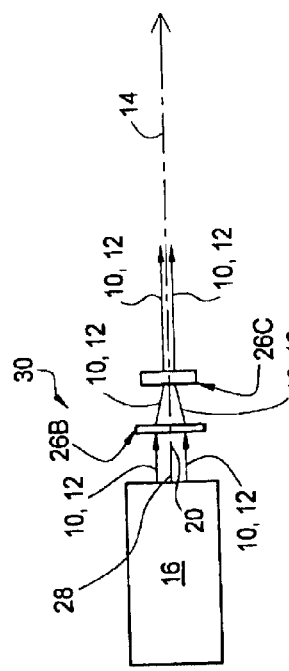

Examples of embodiments of Drift/Deviation Correction Elements 30 for correcting either or both of radial displacement due to thermal drift and angular deviation due to pointing instability are illustrated in FIGS. 5A, 5B and 5C.

FIG. 5A illustrates an embodiment of a Drift/Deviation Correction Element 30 for the correction of angular deviation of a Laser Beam 12 due to pointing instability. As shown, in this instance the Drift/Deviation Correction Element 30 is comprised of a single NSE 26, 26A, 26B, 26C, 26D or 26S such as a Non-Symmetric Hologram Optical Element (NSHOE) or equivalent non-symmetric lens.

First considering the geometric aspects of angular deviation due to pointing instability as illustrated in FIG. 5A, a Laser Beam 12 having angular deviation resulting from pointing instability may be considered as emitting from a point, that is, from Laser 16, such that the Beam Axis 10 of each Laser Beam 12 radiates outwards from that point at an angular deviation θ that is dependent upon the degree of wobble and until the Laser Beam 12 strikes the plane of the NSE 26. A consideration of the geometry of the elements shown in FIG. 5A will show that the angle of incidence α between the Beam Axis 10 and the plane of the NSE 26A will decrease, in a reciprocal relationship, as the angular deviation θ increases. It will also be apparent that the radial displacement Δ between the Centerine Axis 28 of the NSE 26A and the point at which the Beam Axis 10 is incident upon the NSE 26A increases as the angular deviation θ increases. Stated another way, an angular deviation θ will result in both an inversely proportionate angle of incidence α with the NSE 26A and a proportionate radial displacement Δ from the Centerline Axis 28 of the NSE 26A.

It will be apparent that the correction of angular deviation due to pointing instability, requires that the Beam Axes 10 of the Laser Beams 12 be redirected, that is, turned or refracted, through an Correction Angle φ to orient the Beam Axes 10 in the desired manner. In this regard, and for example, the Correction Angle φ may be designed so that the Beam Axes 10 are parallel to HOE Axis 20 upon exiting the NSE 26A. In other instances, the Correction Angle φ may be designed to direct the Laser Beams 12 onto a selected point or area at a predetermined distance from the NSE 26A, such as at the entry face of a second NSE (not shown).

In either instance, and as may be seen from the above discussion of angular deviation geometry, the magnitude of the Correction Angle φ must therefore increase with either increasing radial displacement Δ or with decreasing angle of incidence α. In a first embodiment of an Angular Correction NSE 26A, therefore, the Angular Correction NSE 26A, which may be, for example, a NSHOE or equivalent non-symmetric lens, is designed such that the Correction Angle φ increases proportionally to the radial distance from the central axis of the Angular Correction NSE 26A. As described, therefore, the greater the angular deviation θ of a Beam Axis 10 the greater the radial displacement Δ of the Beam Axis 10 from the central axis of the Angular Correction NSE 26A and the greater the Correction Angle φ.

In a second embodiment of an Angular Correction NSE 26A, the Angular Correction NSE 26A may be designed such that the Correction Angle φ increases with a decreasing angle of incidence α, that is, with an increasing angular deviation θ of the Beam Axis 10. As may be seen, however, the two embodiments of an Angular Correction NSE 26A are equivalent because the relationship between angular deviation θ, angle of incidence α and radial displacement Δ.

As illustrated in FIG. 5A, therefore, the Angular Correction NSE 26A of the Drift/Deviation Correction Element 30 will correct an angular deviation θ by turning, or refracting, the Laser Beam 12 through a Correction Angle φ that is proportionate to the angular deviation θ. The result will therefore be that any Laser Beam 12 having a Beam Axis 10 that is not parallel to the HOE Axis 20 will be turned through a Correction Angle φ so that the Beam Axis 10 will be parallel to the HOE Axis 20 or so that the Beam Axis 10 is directed to a selected focal point or area.

The result of the operation of an Angular Correction NSE 26A is illustrated in FIG. 5B, which is an end view of a Laser 16 showing a possible distribution of Corrected Laser Beams 12C about the Optimum Centerline 14 in comparison with a possible distribution of the Uncorrected Laser Beams 12U.

FIG. 5C, in turn, illustrates an embodiment of a Drift/Deviation Correction Element 30 for the correction of radial displacement of a Laser Beam 12 due to thermal drift. As discussed previously, thermal drift or similar causes of radial displacement result in a radial displacement of a Beam Axis 10 from a desired Optimum Centerline 14, rather than an angular deviation from the Optimum Centerline 14. For this reason, the radial displacement, that is, thermal drift, results in a Beam Axis 10 having an angle of incidence α of approximately 90° with respect to a NSE 26 and correction of radial displacement Δ will be a function of radial displacement Δ rather than of angle of incidence α.

As shown, in this instance the Drift/Deviation Correction Element 30 may be comprised of a Displacement Correction NSE 26B followed by a Collimating NSE 26C, each of which may be, for example, Non-Symmetric Hologram Optical Elements or equivalent non-symmetric lenses.

In this embodiment, and as discussed above, the Correction Angle φ of Displacement Correction NSE 26B increases radially and proportionately to the radial displacement Δ between Centerline Axis 28 of Displacement Correction NSE 26B and the point at which the Beam Axis 10 of a Laser Beam 12 is incident upon the plane of the Displacement Correction NSE 26B. The effect of Drift Correction NSE 26B is therefore to refract or turn a Laser Beam 12 through a Correction Angle φ that is proportionate to the radial displacement Δ of the Beam Axis 10, that is, by an angle proportionate to the thermal drift of the Laser Beam 12. Because the displacement of Beam Axes 10 of Laser Beams 12 resulting from thermal drift is radial, and the Beam Axis 10 of a Laser Beam 12 is thereby approximately parallel to the Optimum Centerline 14, the Beam Axes 10 are usually perpendicular to the entering face of the Displacement Correction NSE 26B. As such, the Correction Angle φ imposed by the Displacement Correction NSE 26B will compress, that is, direct or focus, the Beam Axes 10 onto a point or small area at a fixed distance from the Displacement Correction NSE 26B. As illustrated in FIG. 5C, the focus point of Displacement Correction NSE 26B is near or at the entry face of the second element of Drift/Deviation Correction Element 30, which is shown as Collimating NSE 26C.

Collimating NSE 26C is, in some respects, analogous to an inverse transform of an Angular Correction NSE 26A. That is, and as indicated, Laser Beams 12 enter Collimating NSE 26C from Correction NSE 26B such that their Beam Axes 10 generally are at an angle α with respect to the HOE Axis 20 of Collimating NSE 26C, that is, at an angle analogous to an angular deviation θ. As illustrated, Collimating NSE 26C redirects or turns each incoming Laser Beam 12 through a Correction Angle φ that is inversely proportional to the angle of incidence α, so that the Beam Axes of the Laser Beams exiting Collimating NSE 26C are parallel.

A Drift/Deviation Correction Element 30 comprised of a Displacement Correction NSE 26B followed by a Collimating NSE 26C may thereby correct radial displacement due to thermal drift by first redirecting the Laser Beams 12 to reduce the radial displacement of each Laser Beam 12, by focusing or directing the Laser Beams 12 into a defined area at a defined distance, and then by correcting the relative angles of the Beam Axes 10 to be parallel to the desired Optimum Centerline 14.

The operation of such a Drift/Deviation Correction Element 30 is illustrated in FIG. 5D, which illustrates a possible distribution of Corrected Laser Beams 12C about the Optimum Centerline 14 in comparison with Uncorrected Laser Beams 12U.

Figure 5E:
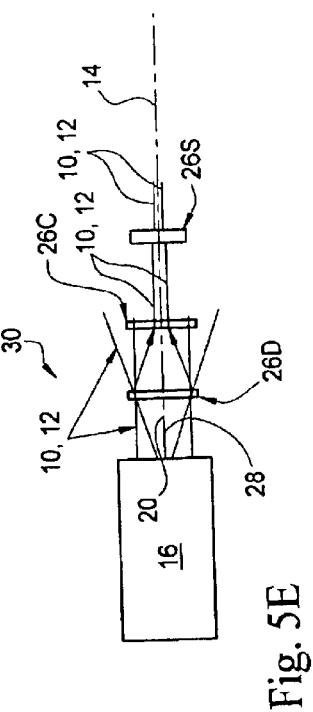

Next considering the case illustrated in FIG. 5E, it will be apparent that angular deviation due to pointing instability and radial displacement due to thermal drift will rarely occur in isolation and that it will be common for both effects to be present in a given situation. As such, the Beam Axes 12 many if not all Laser Beams 12 will show both angular deviation and radial displacement and the radial distance from the Centerline Axis 28 of the NSE 26D at which a given Laser Beam 12 will impinge upon a NSE 26D may be due to radial displacement, or due to angular deviation or due to both in varying degrees.

As such, a two element Drift/Deviation Correction Element 30 may be constructed using, for example, a Deviation Correction NSE 26A followed by a Displacement Correction NSE 26B. Each would function as described above so that the combination would first correct the angular deviation of the Laser Beams 12, redirecting each Laser Beam 12 through a Correction Angle φ dependent upon the angular deviation to output Laser Beams 12 having parallel Beam Axes 10. The first stage would therefore, and in effect, change angular deviation into radial displacement, and radial displacement into angular displacement, so that the output Laser Beams 12 would demonstrate only radial displacement. The second stage would then correct radial displacement, as discussed with regard to FIG. 5C, to provide the final output Laser Beams 12.

Another embodiment of a Drift/Deviation Correction Element 30 is illustrated in FIG. 5E wherein the characteristics of both an Angular Correction NSE 26A and a Displacement Correction NSE 26B are combined in a single Angular/Displacement Correction NSE 26D, which may be comprised, for example, of a NSHOE. In this instance, the Correction Angle φ is a function of both the radial displacement of an impinging Laser Beam 12 from the HOE Axis 20 and the angle of incidence α of a Laser Beam 12 on the Angular/Displacement Correction NSE 26D, so that the single Angular/Displacement Correction NSE 26D performs the function of both an Angular Correction NSE 26A and a Displacement Correction NSE 26B.

In either embodiment, the output of the Drift/Deviation Correction Element 30 is passed through a Collimating NSE 26C to form a collimated Laser Beam 12, and then through a Shaper Element 26S. It will be understood, in this regard, that Collimating NSE 26C and Shaper Element 26S may be arranged in any order, and that these elements may be comprised of, for example, NSHOEs, HOEs, aspheric optical elements, or any other elements that will perform the required functions.

The results of the embodiment illustrated in FIG. 5E are illustrated in FIG. 5F for a possible distribution of Corrected Laser Beams 12C about an Optimum Centerline 14 in comparison with Drift Uncorrected Laser Beams 12DU and Angular Uncorrected Laser Beams 12AU.

Since certain changes may be made in the above described improved the laser beam or wave fronts, without departing from the spirit and scope of the invention herein involved, it is intended that all of the subject matter of the above description or shown in the accompanying drawings shall be interpreted merely as examples illustrating the inventive concept herein and shall not be construed as limiting the invention.

I claim:

1. A correction element for the correction of angular deviation of laser beams due to pointing instability, comprising:
   an angular deviation non-symmetric optical element for redirecting a beam axis of a laser beam through a corrective angle so that the beam axis is parallel with an optimum centerline of the laser beams, wherein
   the corrective angle is dependent upon a radial displacement of the beam axis from a centerline of the angular deviation non-symmetric optical element, and wherein
   the magnitude of the corrective angle increases with one of increasing radial displacement of the beam axis from a centerline of the angular deviation non-symmetric optical element and a decreasing angle of incidence of the laser beam on the angular deviation non-symmetric optical element.

2. The correction element of claim 1, wherein the angular deviation non-symmetric optical element is a non-symmetric hologram optical element.

3. The correction element of claim 1, wherein the angular deviation deviation non-symmetric optical element is a non-symmetric lens.

4. The correction element of claim 1, wherein the angular deviation non-symmetric optical element is a non-symmetric refraction element.

5. The correction element of claim 1, wherein the angular deviation non-symmetric optical element is a non-symmetric diffraction element.

6. A correction element for the correction of radial displacement of laser beams due to thermal drift, comprising:
   a radial displacement non-symmetric optical element for redirecting a beam axis of a laser beam through a first corrective angle dependent upon a radial displacement of the beam axis from a centerline of the radial displacement non-symmetric optical element and
   directing the beam axis onto a focus area at a selected distance from the radial displacement non-symmetric optical element, wherein
   the magnitude of the corrective angle increasing with increasing radial displacement of the beam axis from the centerline of the radial displacement non-symmetric optical element, and
   a collimating non-symmetric optical element located at the focus area for redirecting the laser beam through a second corrective angle wherein the magnitude of the second corrective angle increases with one of decreasing radial displacement of the beam axis from a centerline of the collimating non-symmetric optical element and an increasing angle of incidence of the laser beam on the collimating non-symmetric optical element.

7. The correction element of claim 6, wherein the radial displacement non-symmetric optical element is a non-symmetric hologram optical element.

8. The correction element of claim 6, wherein the radial displacement non-symmetric optical element is a non-symmetric lens.

9. The correction element of claim 6, wherein the radial displacement non-symmetric optical element is a non-symmetric refraction element.

10. The correction element of claim 6, wherein the radial displacement non-symmetric optical element is a non-symmetric diffraction element.

11. A correction element for the correction of at least one of an angular deviation of laser beams due to pointing instability and radial displacement of laser beams due to thermal drift, comprising:
    an angular deviation non-symmetric optical element for redirecting a beam axis of a laser beam through a first corrective angle so that the beam axis is parallel with an optimum centerline of the laser beams, wherein the first corrective angle increases with a decreasing angle of incidence of the laser beam on the angular deviation on-symmetric optical element, a radial displacement non-symmetric optical element for redirecting a beam axis of a laser beam through a second corrective angle dependent upon a radial displacement of the beam axis from a centerline of the radial displacement non-symmetric optical element and directing the beam axis onto a focus area at a selected distance from the radial displacement non-symmetric optical element, wherein the second corrective angle increases with increasing radial displacement of the beam axis from the centerline of the radial displacement non-symmetric optical element, and a collimating non-symmetric optical element located at the focus area for redirecting the laser beam through a third corrective angle wherein the magnitude of the third corrective angle increases with one of decreasing radial displacement of the beam axis from a centerline of the collimating non-symmetric optical element and an increasing angle of incidence of the laser beam on the collimating non-symmetric optical element.

12. The correction element of claim 11, wherein at least one of the angular deviation non-symmetric optical element, the radial displacement non-symmetric optical element and the collimating non-symmetric optical element is a non-symmetric hologram optical element.

13. The correction element of claim 11, wherein at least one of the angular deviation non-symmetric optical element, the radial displacement non-symmetric optical element and the collimating non-symmetric optical element is a non-symmetric lens.

14. The correction element of claim 11, wherein at least one of the angular deviation non-symmetric optical element, the radial displacement non-symmetric optical element and the collimating non-symmetric optical element is a non-symmetric refraction element.

15. The correction element of claim 11, wherein at least one of the angular deviation non-symmetric optical element, the radial displacement non-symmetric optical element and the collimating non-symmetric optical element is a non-symmetric diffraction element.

16. A correction element for the correction of at least one of an angular deviation of laser beams due to pointing instability and radial displacement of laser beams due to thermal drift, comprising:

a correcting non-symmetric optical element for redirecting a beam axis of a laser beam through a first corrective angle so that the beam axis is parallel with an optimum centerline of the laser beams, wherein the first corrective angle increases with a decreasing angle of incidence of the laser beam on the angular deviation non-symmetric optical element, and redirecting a beam axis of a laser beam through a second corrective angle dependent upon a radial displacement of the beam axis from a centerline of the radial displacement non-symmetric optical element and directing the beam axis onto a focus area at a selected distance from the radial displacement non-symmetric optical element, wherein the second corrective angle increases with increasing radial displacement of the beam axis from the centerline of the radial displacement non-symmetric optical element, and a collimating non-symmetric optical element located at the focus area for redirecting the laser beam through a third corrective angle wherein the magnitude of the third corrective angle increases with one of decreasing radial displacement of the beam axis from a centerline of the collimating non-symmetric optical element and an increasing angle of incidence of the laser beam on the collimating non-symmetric optical element.

17. The correction element of claim 16, wherein at least one of the angular deviation non-symmetric optical element, the radial displacement non-symmetric optical element and the collimating non-symmetric optical element is a non-symmetric hologram optical element.

18. The correction element of claim 16, wherein at least one of the angular deviation non-symmetric optical element, the radial displacement non-symmetric optical element and the collimating non-symmetric optical element is a non-symmetric lens.

19. The correction element of claim 16, wherein at least one of the angular deviation non-symmetric optical element, the radial displacement non-symmetric optical element and the collimating non-symmetric optical element is a non-symmetric refraction element.

20. The correction element of claim 16, wherein at least one of the angular deviation non-symmetric optical element, the radial displacement non-symmetric optical element and the collimating non-symmetric optical element is a non-symmetric diffraction element.

* * * * *